United States Patent [19]

Umemoto

[11] Patent Number: 4,964,123
[45] Date of Patent: Oct. 16, 1990

[54] RESETTING CIRCUIT FOR A MICROCOMPUTER

[75] Inventor: Toshiaki Umemoto, Iwaki, Japan
[73] Assignee: Alpine Electronics Inc., Tokyo, Japan
[21] Appl. No.: 244,890
[22] Filed: Sep. 15, 1988
[30] Foreign Application Priority Data Dec. 16, 1987 [JP] Japan .................. 62-319965

[51] Int. Cl.$^5$ .......................................... G06F 11/00
[52] U.S. Cl. ..................... 371/12; 371/16.3; 371/62
[58] Field of Search ............. 371/12, 16.3, 62, 66; 364/200, 900

[56] References Cited

U.S. PATENT DOCUMENTS

| | | | |
|---|---|---|---|
| 4,399,537 | 8/1983 | Jones | 371/16.3 |
| 4,513,417 | 4/1985 | Lamb et al. | 371/12 |
| 4,551,841 | 11/1985 | Fujita et al. | 371/66 |
| 4,586,179 | 4/1986 | Sirazi et al. | 371/12 |
| 4,591,782 | 5/1986 | Germer | 371/66 |
| 4,625,309 | 11/1986 | Nitschke | 371/16.3 |
| 4,683,568 | 7/1987 | Urban | 371/16.3 |
| 4,689,766 | 8/1987 | Kent | 371/16.3 |

*Primary Examiner*—Charles E. Atkinson
*Attorney, Agent, or Firm*—Guy W. Shoup; Paul J. Winters

[57] ABSTRACT

Microcomputers or microprocessors are required to be reset after supply of a power source voltage to the microcomputers or microprocessors is interrupted due to the replacement of the microcomputers. A time constant circuit generates a reset signal from a capacitor of the time constant circuit after a predetermined time has passed since the source voltage was applied to the microcomputers. A discharging circuit is connected to the time constant circuit, and rapidly discharges the charge stored in the capacitor of the time constant circuit after the supply of the source voltage is interrupted.

3 Claims, 2 Drawing Sheets

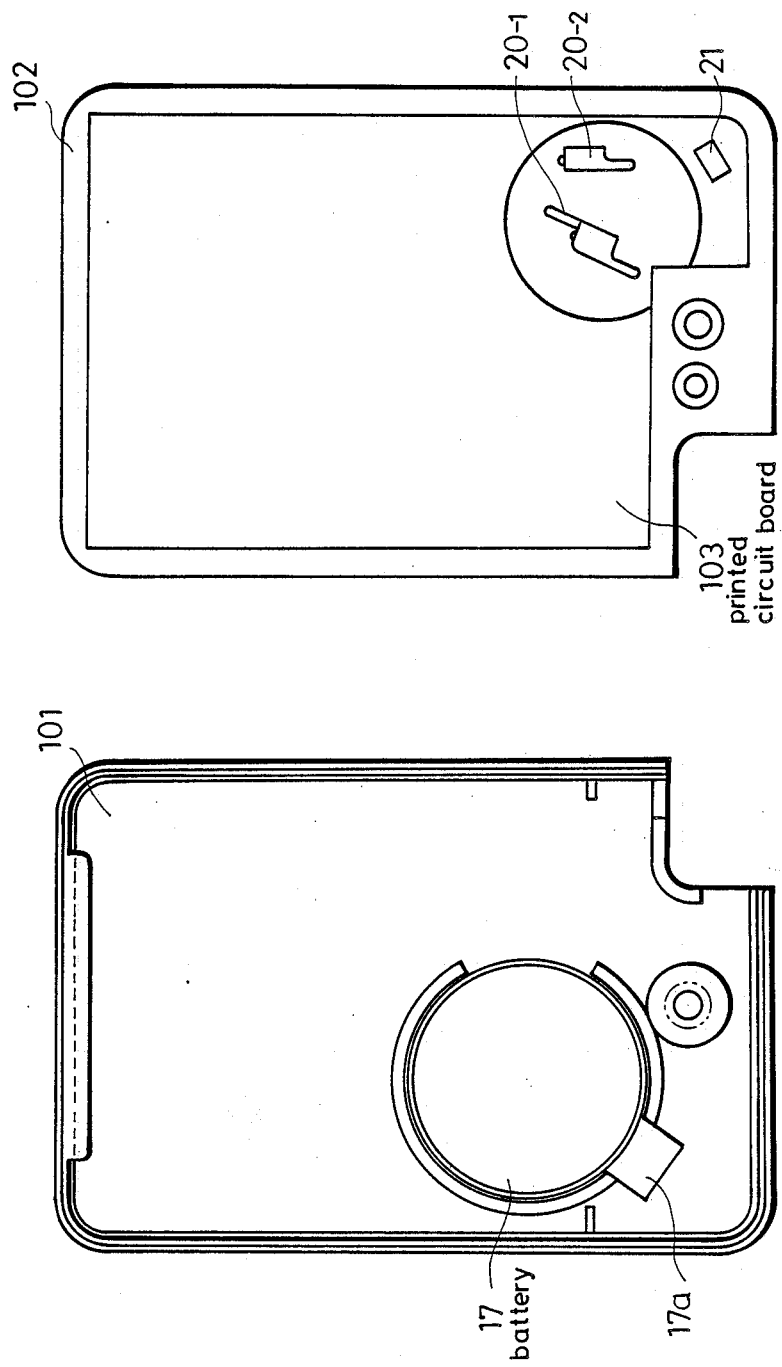

RESETTING CIRCUIT FOR A MICROCOMPUTER

BACKGROUND OF THE INVENTION

1. Field of the Invention

The present invention generally relates to a resetting circuit for a microcomputer. More specifically, the present invention is directed to a resetting circuit for a low consumption current device including a microcomputer to which a voltage is applied from a battery, and which functions as a controller, for instance, directed to a resetting circuit of a microcomputer in a remote control device or the like.

2. Description of the Prior Art

In an apparatus including a microcomputer, or microprocessor functioning as a controller, it is necessary to reset an internal circuit condition of this microcomputer by generating a reset signal after a predetermined time has passed since a predetermined voltage was applied to the microcomputer when the microcomputer was energized by a power source.

To this end, a time constant circuit is employed in such an apparatus. After a predetermined time has elapsed since the microcomputer was energized, the voltage across capacitor terminals of the time constant circuit is preset to be higher than a given threshold level. As a result, a reset signal is changed from a low level to a high level, which enables the microcomputer to be reset.

To reset the microcomputer every time the microcomputer is energized by a power supply, the signal level of the reset signal (i.e., the voltage across the capacitor terminals) must be low.

However, in a low consumption current circuit such as a remote control apparatus employing a battery as a power source, a current discharged from the capacitor is extremely low when the power source is disconnected from the low consumption current circuit, and also a considerably long time period is required until the terminal voltage of the capacitor is lower than the predetermined threshold level. In other words, a substantially long time has passed in order that the reset signal becomes a low level. Under these conditions, if the power switch is turned on before the reset signal becomes a low level, the microcomputer cannot be set and may be brought into an erroneous operation because the signal level of this reset signal cannot be changed from the low level to the high level.

It is therefore an object of the present invention to provide a resetting circuit for a microcomputer, even if it is constructed of a low consumption current circuit, capable of resetting the microcomputer when it is energized by a power source.

SUMMARY OF THE INVENTION

The above object of the invention and other features thereof are accomplished by providing a resetting circuit for resetting a microcomputer when applying a power source voltage, comprising: a time constant circuit for generating a reset signal from a capacitor terminal after a predetermined time has passed since the source voltage was applied to the microcomputer; and, a discharging circuit for discharging charge stored in the capacitor of the time constant circuit after the supply of the source voltage is interrupted.

BRIEF DESCRIPTION OF THE DRAWINGS

For a better understanding of the invention, reference is made to the following description in conjunction with the accompanying drawings; in which.

DETAILED DESCRIPTION OF THE PREFERRED EMBODIMENTS

Figure 1:
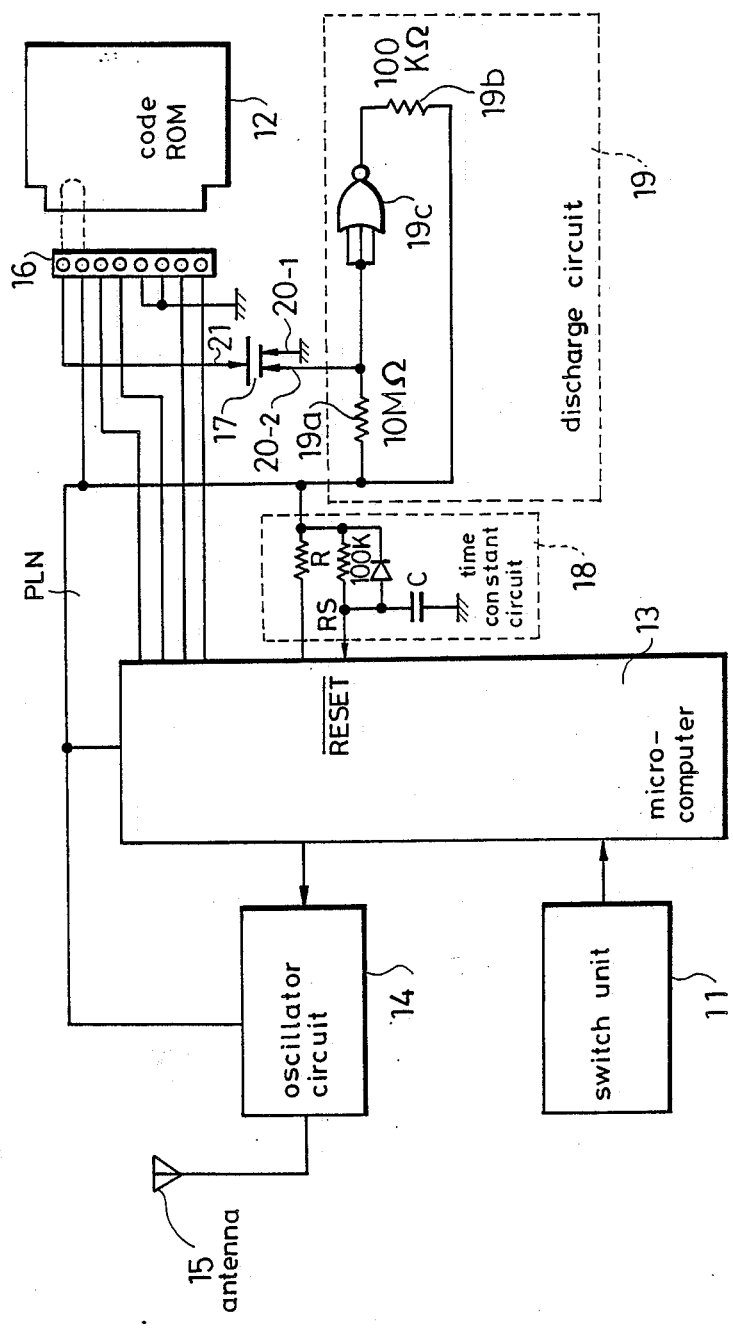
FIG. 1 is a schematic block diagram of a resetting circuit for a microcomputer, according to the present invention, employed in a remote control circuit; and, FIGS. 2a and 2b illustrate arrangements of a case.

FIG. 1 is a block diagram where the resetting circuit for the microcomputer, according to the invention, is adopted to the remote control circuit. In this circuit diagram, reference numeral 13 denotes a microcomputer, reference numeral 17 indicates a battery, reference numeral 18 represents a time constant circuit, and reference numeral 19 is a discharging circuit.

Operation of this resetting circuit is as follows. After a predetermined time period has elapsed when a source voltage was applied by the battery 17 to the microcomputer 13, this microcomputer 13 is reset by changing the low level of the reset signal "RS", as the output from the time constant circuit 18, into the high level. Then, when the battery 17 is disconnected from the microcomputer 13, the charge which has so far been charged into the capacitor "C" is quickly discharged via a path defined by a resistor "R", a resistor 19b of the discharging circuit 19, and a C-MOS inverter 19c, with the result that the signal level of the reset signal "RS" is changed into the low level.

Referring again to the circuit diagram of FIG. 1, the resetting circuit employed in the remote control apparatus will now be described. It should be noted that this remote control apparatus is used for enabling a burglar preventing system mounted on an automobile to be in operation, or non-operation.

In FIG. 1, reference numeral 11 indicates a switch unit on which various switches are mounted, reference numeral 12 represents a code ROM (read only memory) for storing ID (identification) codes specified to an automobile and other codes adapted to various switches, and detachably mounted on a printed circuit board. Reference numeral 13 is a microcomputer. The functions of the microcomputer 13 are as follows.

(i) At a resetting time after the power source is connected to the microcomputer 13, the ID codes and codes corresponding to various keys are read out from the code ROM 12, and then are stored into a built-in memory.

(ii) A predetermined process is carried out from the head of the program by depressing the key, and a judgement is made to the depressed key.

(iii) The code corresponding to the depressed key and the ID codes are output.

Furthermore, reference numeral 14 indicates an oscillator circuit which oscillates at a high frequency, and modulates the codes output from the microcomputer 13 with the oscillator output so as to output the modulated codes, reference numeral 15 indicates an antenna for emitting the modulated signal output from the oscillator circuit 14 as an electromagnetic wave, reference numeral 16 denotes a connector into which the code ROM 12 is inserted, reference numeral 17 is a battery, and reference numeral 18 is a CR time constant circuit. An input terminal of this CR time constant circuit 18 is connected to a power source line PLN, whereas an output terminal thereof is connected to a reset terminal of the microcomputer 13. It should be noted that the power source line PLN is connected via a printed circuit pattern (dotted line) on the code ROM 12 inserted into the connector 16, to a plus terminal of the battery 17. Reference numeral 19 represents a discharging circuit including a resistor 19a of 10 MΩ (megaohms), a resistor 19b of 100 KΩ (killoohms), and a C-MOS inverter 19c.

The above-described remote control circuit except for the battery 17 is mounted on the printed circuit board, and stored into a compact case, resulting in a portable case. As illustrated in FIG. 2, the case is constructed of an upper case 101 (FIG. 2a) and a lower case 102 (FIG. 2b). The battery 17 is stored into the upper case 101 in such a manner that the minus terminal of the battery 17 is exposed from the front surface thereof. The printed circuit board 103 is fixed on the lower case 102. Contacts 20-1 and 20-2 made in contact with the minus terminal of the battery 17 and also another contact 21 made in contact with the plus terminal of the battery 17 are formed on the printed circuit board. Thus, when the upper case 101 is overlapped with the lower case 102 to shut these cases with each other, the contacts 20-1 and 20-2 formed on the printed circuit board 103 are in contact with the minus terminal of the battery 17, whereas the contact 21 is in contact with the plus terminal 17a of the battery 17.

Referring now to FIGS. 1 and 2, operations of the resetting circuit according to the invention is explained.

At the initial stage, the battery 17 is set at a predetermined position by opening the case, and thereafter, when the case is shut, the minus terminal of the battery 17 is made in contact with the contacts 20-1 and 20-2, and simultaneously the plus terminal 17a thereof is made in contact with the contact 21. As a result, a voltage is applied via the power source line PLN to the microcomputer 13, oscillator circuit 14, time constant circuit 18, and discharging circuit 19.

When the voltage is applied, the capacitor C of the time constant circuit 18 is charged under the time constant determined by multiplying R by C via the resistor R, and the voltage across the capacitor C becomes higher than the predetermined threshold level after a predetermined time period, so that the reset signal RS changes its signal level from a low level to a high level. As a result, the microcomputer 13 can be reset by this reset signal RS having the high level. Thus, once the microprocessor 13 is reset, the remote control operation can be performed.

It should be noted that since the earth level signal (low level signal) is input into the inverter 19c of the discharging circuit, the output of this inverter is at a high level, and no current flows through the resistor 19b having a relatively low resistance value. This implies low power consumption. In other words, the current flows through only the resistor 19a having a very large resistance value of 10 MΩ. Moreover, since the value of this current is small, the power consumption can be suppressed, which causes no problem.

Under these conditions, when either the battery 17 or code ROM 12 is required to be replaced and the case is opened, the electrical contact between the plus, minus terminals of the battery 17 and respective contacts is broken. Then, the voltage disappears from the power source line PLN, and the high level signal is supplied to the C-MOS inverter 19c and the output thereof becomes low level.

As a result, the charge charged in the capacitor C of the time constant circuit 18 is rapidly discharged via the resistor 19b having a resistance value of 100 kΩ and the C-MOS inverter 19c of the discharging circuit 19, and thus the reset signal RS becomes low level within a short time.

As a consequence, when the case is shut after either the battery or code ROM is replaced, the reset signal will change from the low level to the high level after a predetermined time has passed since the given voltage is applied to the microcomputer 13, so that the microcomputer 13 can reset with certainty.

While the present invention has been described in detail, the resetting circuit is arranged by employing the time constant circuit for generating the reset signal after a predetermined time has elapsed since the power supply voltage was applied to the microcomputer, and the discharging circuit for rapidly discharging the charge charged in the capacitor of the time constant circuit after interrupting the supply of the power source voltage. The resetting operation for the microcomputer can be effected with certainty when the microcomputer is energized by the power source even if the low current consumption circuit is constructed.

What is claimed is:

1. A resetting circuit for resetting a microcomputer when applying a power source voltage, comprising:
    a time constant circuit including a capacitor for generating a reset signal in response to said power source voltage being applied to said microcomputer after a period of time determined by the charging time of said capacitor by said source voltage has passed, said capacitor beginning charging when said source voltage is applied; and,
    a discharging circuit for discharging charge stored in the capacitor of the time constant circuit in response to the supply of the source voltage being interrupted.

2. A resetting circuit as claimed in claim 1, wherein said time constant circuit comprises a resistor; a capacitor connected in series with said resistor; and a diode connected across said resistor biased such that said resistor is bypassed when said capacitor is being discharged.

3. A resetting circuit as claimed is claim 1, wherein said discharging circuit includes a series circuit of a first resistor having a high resistance value, a C-MOS inverter, and a second resistor having a low resistance value, said discharging circuit connected substantially in series with said capacitor.

* * * * *